UNITED STATES PATENT OFFICE.

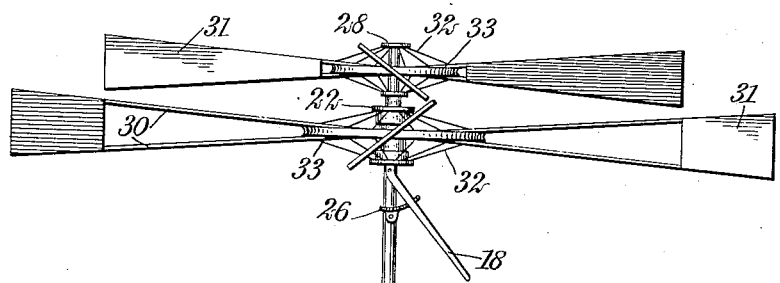
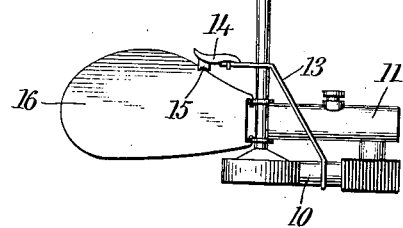
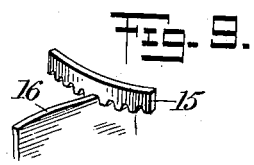
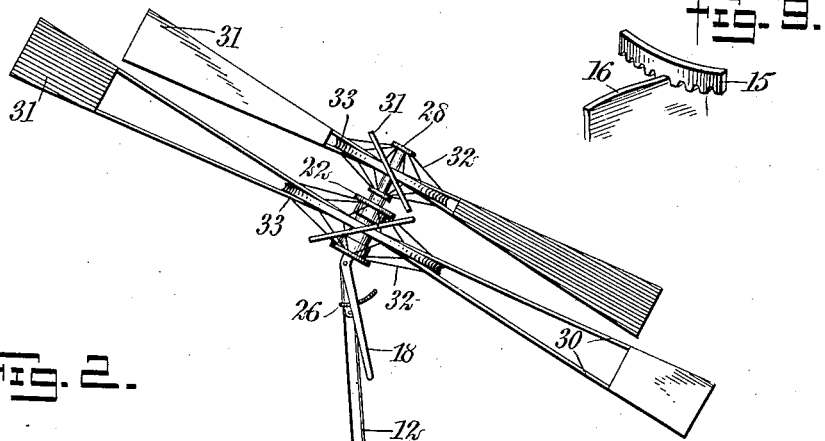
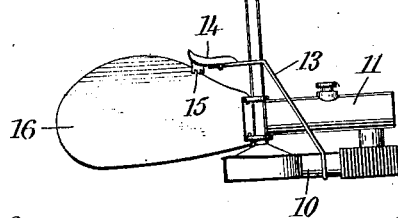

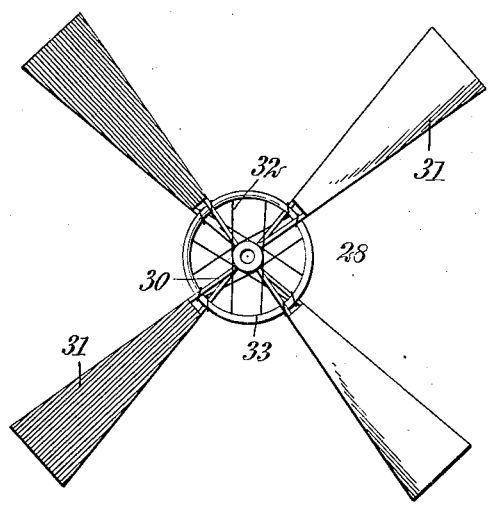
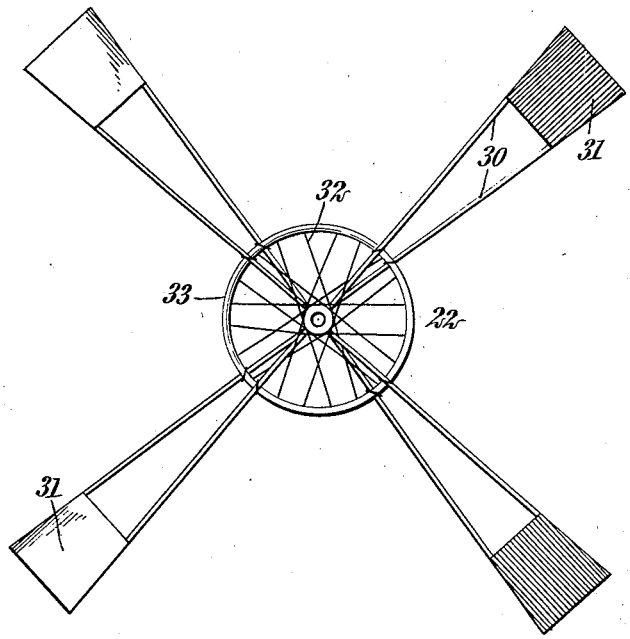

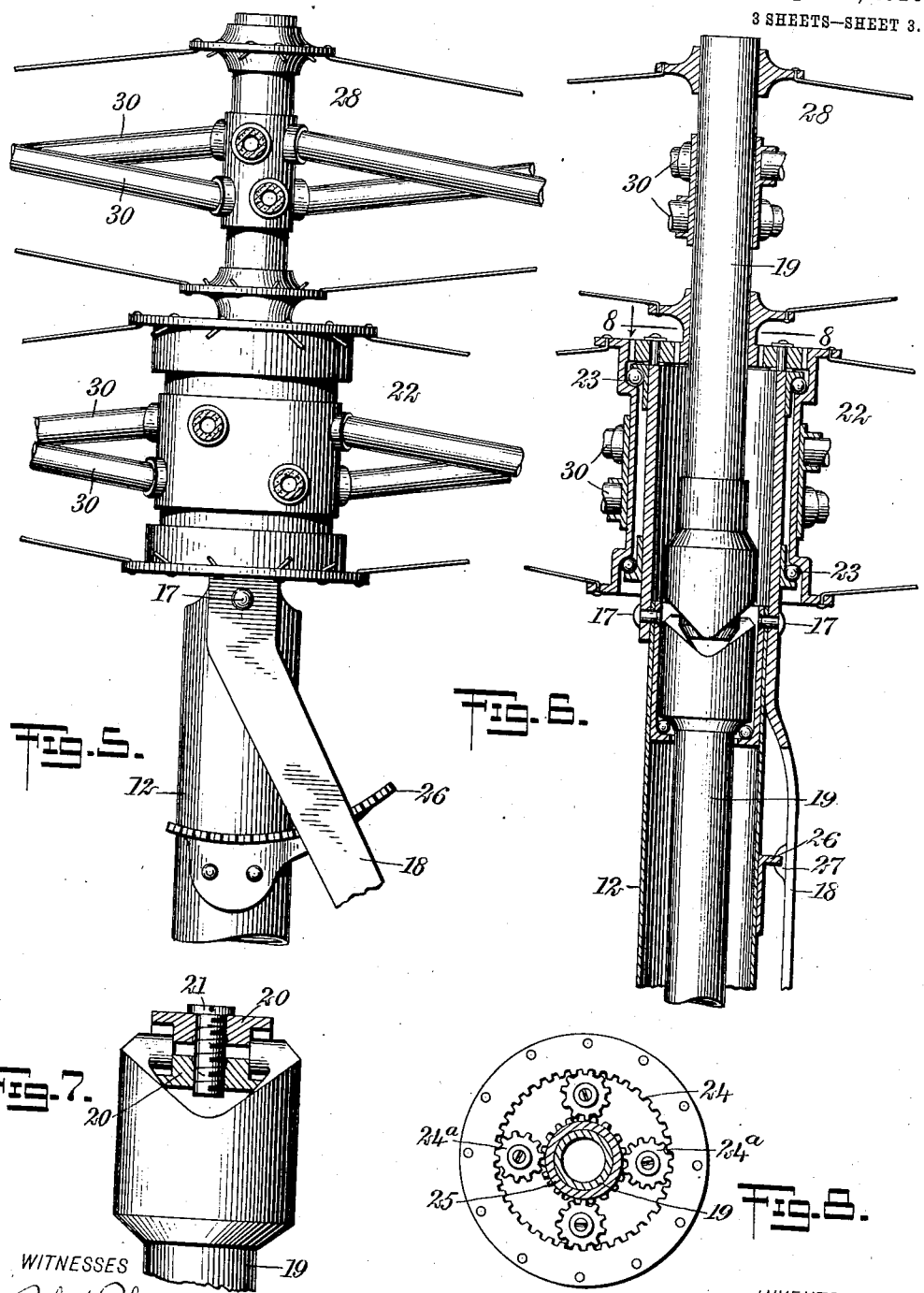

GUSTAVE H. BREKKE, OF SEATTLE, WASHINGTON.

AIR-SHIP.

955,049.

Specification of Letters Patent. Patented Apr. 12, 1910.

Application filed May 16, 1908, Serial No. 433,167. Renewed November 10, 1909. Serial No. 527,306.

*To all whom it may concern:*

Be it known that I, GUSTAVE H. BREKKE, a citizen of the United States, and a resident of Seattle, in the county of King and State of Washington, have invented a new and Improved Air-Ship, of which the following is a full, clear, and exact description.

This invention is an improvement in air ships, having in view primarily, a dirigible flying machine of simple and practical construction under easy and positive control of the operator.

The machine is of that type which depends on propellers for suspending it in the air, and is more especially designed for carrying the operator only.

The invention resides in certain special features of construction and combination of parts as will be hereinafter particularly described and claimed.

Reference is to be had to the accompanying drawings forming a part of this specification, in which similar characters of reference indicate corresponding parts in all the views.

Figure 1 is a side elevation of the machine complete; Fig. 2 is a corresponding view showing the propellers thrown to an angular position; Fig. 3 is a plan of the upper propeller; Fig. 4 is a plan of the lower propeller; Fig. 5 is a fragmentary view partly in section and on an enlarged scale, of the propellers and adjacent portion of the driving mechanism; Fig. 6 is a vertical central sectional view of the same; Fig. 7 is a view, partly in section, of a portion of the universal joint between the two sections of the driving shaft; Fig. 8 is a cross section, on the line 8—8 of Fig. 6, looking in the direction of the arrow; and Fig. 9 is a fragmentary perspective view illustrating the manner in which the rudder is held in adjusted position.

A laterally-disposed motor 10 forms the base of the machine and is preferably of the internal combustion type, supplied from a gasolene or other fuel-tank 11, located thereabove, the said tank being supported from the motor and on a tubular post 12, the latter being rigidly and centrally secured to the crank-case of the motor. Connecting the motor and post 12 together is an angular brace 13, having a lateral extension to which is adjustably fixed a seat 14, preferably in the nature of an ordinary bicycle saddle. The seat 14 carries a notched bar 15 on its under face, which is adapted to be engaged by the edge of a rudder 16, having a pivotal or hinge connection with the tubular post 12, adapting the rudder to swing in a horizontal plane.

The post 12 is made in two sections, hinged or pivoted together at opposite sides by means of overlapping portions, through which pass pivot-pins 17, one of said portions, which is rigid with the upper section of the post, being angularly bent to one side and extended to provide a lever 18. Arranged within the post is the motor drivingshaft 19, preferably hollow, to insure lightness and strength, and is also made in two sections connected together by a universal joint arranged in the plane of the pivot pins 17 and constructed, as shown in detail in Fig. 7, of two disks 20, 20, coupled together by a center screw 21 and having notches for engaging opposed trunnions on each shaft section.

The upper section of the tubular post receives the hub of a propeller 22, which has roller bearings 23 between it and this section of the post, arranged respectively at the top and bottom, and is further provided with an internal gear 24, as best shown in Fig. 8, in mesh with a number of substantially equally-spaced pinions 24ª, four being shown, which, in turn, mesh with a gear 25 fixed to the upper section of the driving shaft and formed rigid with or as a part of an upper propeller 28. The upper end of the upper section of the driving shaft is preferably utilized as the hub of the propeller 28. Both the propellers 22 and 28 may be swung to an inclined position as a unit by the operation of the lever 18, this lever being provided with means for holding it in any desired position of adjustment, which consists of an arc-shaped rack-bar 26 and a projection 27, adapted to be engaged therewith, formed at one edge of the lever. This projection may be passed into the teeth of the rack-bar by springing the lever outwardly sufficiently to carry the projection beyond the plane of the teeth before swinging the lever to one side.

The propellers 22 and 28 are each constructed of spokes 30, preferably of bamboo, and covered with some fabric, such as silk, forming blades 31, the blades of the upper propeller being of less length than those of the lower propeller, and are reversely inclined, whereby, when they are reversely driven, they will exert forces in the same direction and will each neutralize the tendency of the other to revolve the tubular post and the lower portion of the machine. The spokes of the lower and larger propeller, it will be observed from Figs. 1, 2 and 4, are covered only at their tip ends, or that part of their length projecting beyond the spokes of the upper propeller, whereby the passage of the air set in motion by the upper propeller will not be impeded, but is free to pass between the spokes of the propeller below. For bracing the spokes of each propeller I preferably provide the spokes 32 and a rim 33, as in an ordinary bicycle, the rim being located between the spokes of each propeller blade, and the wire spokes of the wheel connecting the rim to the hubs.

When the motor is set in motion the driving shaft will rotate the upper propeller in the same direction and will, through the gear 25, pinions 24$^a$ and internal gear 24, drive the lower propeller in the opposite direction.

Having thus described my invention, I claim as new and desire to secure by Letters Patent:

1. In an air ship, a motor normally horizontally disposed and forming the base of the ship and having an upright driving-shaft longitudinally immovable with respect to the motor, concentrically-arranged propellers having reversely inclined blades driven in opposite directions from the motor through said shaft, and means for swinging the propellers to and from an inclined position at the top of the shaft.

2. In an air ship, a hollow post composed of two sections pivoted together at diametrically opposite points, a driving shaft composed of two sections pivoted together at approximately the same elevation as the pivotal connection between the two sections of the post, a propeller journaled on the upper section of the post, a propeller fixed to the upper section of the driving-shaft, having its blades reversely inclined to the first-mentioned propeller, and means journaled on the post for driving the propeller from the driving shaft in a reverse direction.

3. In an airship, the combination of an upright post composed of an upper and lower section pivoted together, a driving shaft within the post composed of an upper and lower section pivoted together and longitudinally immovable with respect to the post, a propeller carried by the upper section of the shaft, a propeller carried by the upper section of the post, and means for swinging the upper section of the post and the upper section of the shaft on their pivots to move the propellers to and from an inclined position.

4. In an airship, a motor, an upright tubular post rigid with the crank-case of the motor and composed of two sections pivoted together, a propeller having a hub surrounding and journaled on the upper section of the post provided with an internal gear, a driving-shaft composed of two sections pivoted together and arranged within the sections of the post, a gear fixed to the upper section of the driving-shaft, a propeller secured to the upper section of the driving shaft, having its blades reversibly inclined to the blades of the first-mentioned propeller, and pinions in mesh with both the said gears and the internal gear.

5. In an airship, a laterally-disposed motor, an upright post rigid with the crank-case of said motor, an angular brace rigidly connecting the motor with the post and provided with a lateral extension, a saddle adjustable on said extension, and a rudder pivoted to the post and extending to the rear of said saddle.

6. In an airship, a propeller comprising spokes having a covering forming blades, and a rim arranged between the spokes of each blade, provided with spokes connecting it with the hub of the propeller at the opposite sides of the propeller spokes.

7. In an air ship, a motor, an upright shaft driven by the motor immovable longitudinally with respect thereto and made in two sections pivotally connected together near the top, a propeller carried by the upper section of the shaft, and means for swinging the upper section of the shaft to move the propeller to and from an inclined position.

8. In an air ship, the combination of an upright post composed of an upper and lower section pivoted together, a driving shaft within the post composed of an upper and lower section pivoted together at substantially the same elevation as the pivotal connection between the two sections of the post and longitudinally immovable with respect to the post, a propeller carried by the upper section of the driving shaft, a propeller journaled on the upper section of the post and driven by the driving shaft in the opposite direction, and means for swinging the upper section of the post and the upper section of the driving shaft on their pivots to carry the propellers to and from an inclined position.

In testimony whereof I have signed my name to this specification in the presence of two subscribing witnesses.

GUSTAVE H. BREKKE.

Witnesses:
WALTER B. ALLISON,
H. F. SOMERS.